J. G. NOLEN.
DIAPHRAGM TENSIONING MEANS.
APPLICATION FILED MAR. 19, 1917.
1,242,228.
Patented Oct. 9, 1917.
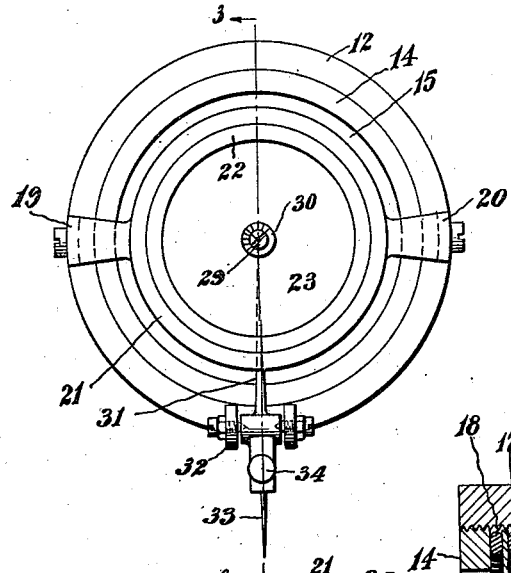
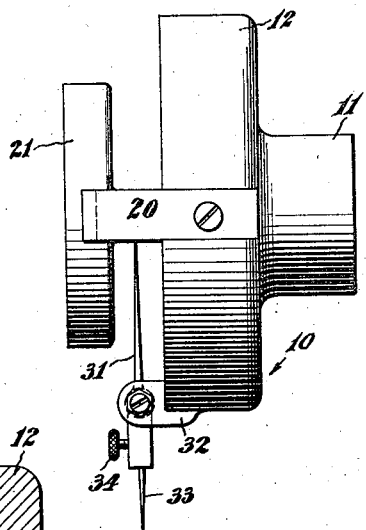
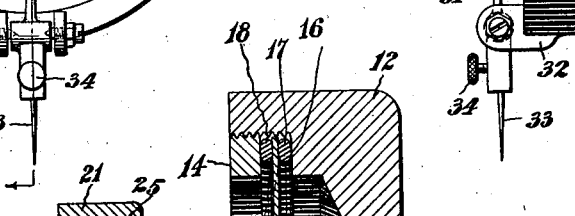
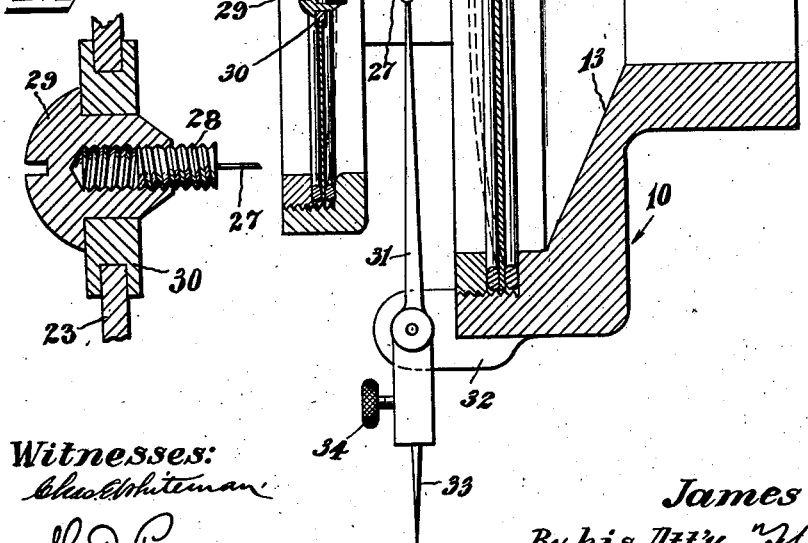
Witnesses:
Inventor:
James G. Nolen.
By his Atty,

UNITED STATES PATENT OFFICE.

JAMES G. NOLEN, OF NEW YORK, N. Y.

DIAPHRAGM-TENSIONING MEANS.

1,242,228.  Specification of Letters Patent.  Patented Oct. 9, 1917.

Application filed March 19, 1917. Serial No. 155,687.

*To all whom it may concern:*

Be it known that I, JAMES G. NOLEN, a citizen of the United States, residing in New York, in the county of New York and State of New York, have invented certain new and useful Improvements in Diaphragm-Tensioning Means, of which the following is a specification.

This invention relates to sound transmitters in general, and more especially to transmitters for talking machines.

With sound transmitters it has been found that the disk ordinarily used, at a given tension, does not equally transmit the low tones and high tones, and that, when the disk is substantially flexible as distinct from being placed under tension, the lower tones produced by the bass singer, bass viol, would be best produced, and that on the other hand, when the disk is placed under tension, the higher tones produced by the soprano, piccolo, violin and the like, would be best produced.

To this end, the present invention aims to provide a means whereby the transmitting disk may, with facility, be adjusted to suit the pitch of the sound to be produced.

The present invention further contemplates the provision of certain features of construction particularly adapted for carrying out the main purpose of the present invention, to wit: the provision of a second disk which is connected to the main transmitting disk by a tension member that is adjustable to draw the centers of the disks toward one another.

These and other features, capabilities, and advantages of the invention will appear from the subjoined detail description of one specific embodiment of the invention illustrated in the accompanying drawing, in which—

Figure 1 is an end elevation of a device made in accordance with the present invention.

Fig. 2 is a side elevation thereof.

Fig. 3 is an enlarged section on the line 3—3 of Fig. 1.

Fig. 4 is an enlarged detail view showing the connection of the tensioning member to the second disk of the device.

In the embodiment illustrated there is provided a housing 10 having a diminished cylindrical portion 11, from which the sound issues and an enlarged cylindrical portion 12, the inner periphery of the portion 11 graduating into the inner periphery of the portion 12 by means of a conical surface 13. The outer end of the portion 12 is internally screw threaded to receive the annulus 14 which is adapted to press and firmly secure the disk 15, preferably composed of mica, against the shoulder 16 on the portion 12, the disk 15 being spaced from the shoulder 16 by the rubber gasket 17 and from the annulus 14 by the rubber gasket 18.

Secured to the portion 12 by the strips 19 and 20 is the annular frame 21, the end of the frame removed from the housing 10 being internally screw threaded to receive the annulus 22 which presses and firmly secures the disk 23, preferably composed of mica, against the shoulder 24 of the frame 21, the disk 23 being spaced from the shoulder 24 by the rubber gasket 25 and from the annulus 22 by the rubber gasket 26.

The disks 15 and 23 are connected to one another by a tensioning member such as the wire 27. The wire is preferably secured to the center of the disk 15, at one end, and at its other end secured to the screw 28 which is screw threadedly secured in the bore of the screw 29, which extends through the disk member 30. Secured to the center of the disk 23, the wire 27 is fixed against rotation by its connection with the disk 15, and consequently when the screw 29 is turned, such screw 29 will turn relative to the screw 28 fixed to the wire 27 and thereby permit adjusting the distance between the disks 15 and 23 and the consequent tension or flexibility in the disks 15 and 23.

The disk 23, of course, is mainly provided to form a support for the wire 27, the main object of the arrangement being to facilitate the tensioning of the disk 15, or the reduction of the tension in such disk 15.

The wire 27 has secured to it a lever member 31 which is fulcrumed to the bracket 32, extending from the lower end of the portion 12. The lower end of the lever 31 is provided with a seat for the needle 33 and a screw 34 by means of which the needle 33 may be secured to such lever 31 in the usual manner.

It is obvious that various changes and modifications may be made to the details of construction without departing from the general spirit of the invention.

I claim:

1. In a phonographic sound box, etc., a housing; a transmitting-disk supported by the housing; a second tensioning disk supported parallel to the transmitting disk on a common central axial line; a needleholder-bar pivotally supported by the housing with one end in line with the common axis of the two disks; a wire connected at the two ends with the two disks at their axial centers, and with the end of the needle-bar at its center; and means for tensioning the wire so as to draw the centers of the disks toward each other.

2. In a phonographic sound box, etc., a housing; a transmitting-disk supported by the housing; a second tensioning disk supported parallel to the transmitting disk on a common central axial line; a needle-holder-bar pivotally supported by the housing with one end in line with the common axis of the two disks; a central female screw-threaded hub secured to the tensioning disk; a tensioning-screw working in the hub; and a tensioning wire connected adjacent to its center with the needle-holder-bar, and at one end with the transmitting-disk, and at the other with the tensioning-screw.

3. In a sound transmitter, the combination with a sound transmitting disk, a second disk, a needle, a wire connecting said disks to one another, means for connecting said needle to said wire, and means for drawing the disks toward one another according to the average pitch of sounds to be produced.

4. In a sound transmitter, the combination with a transmitting disk, a second disk, a needle, means for connecting said disks to one another, means for connecting said needle to said connecting means, and means for drawing the disks toward one another according to the average pitch of sounds to be produced.

5. In a sound transmitter, the combination with a transmitting disk, a second disk, a needle, means for drawing the disks toward one another according to the average pitch of sounds to be produced, and means for connecting said needle to said drawing means.

6. In a sound transmitter, the combination with a transmitting disk, a second disk mounted parallel to said transmitting disk, a needle, means for drawing the disks toward one another according to the average pitch of sounds to be produced, and means for connecting said needle to said drawing means.

7. In a sound transmitter, the combination with a transmitting disk, a second disk, a housing for said transmitting disk, a bracket extending from said housing for mounting said second disk parallel to said transmitting disk, a needle, a wire connected to said transmitting disk, adjustable means connecting said second disk with said wire whereby the disks may be drawn toward one another according to the average pitch of sounds to be produced, and means for connecting said needle to said wire.

JAMES G. NOLEN.

Witnesses:
H. M. KILPATRICK,
H. D. PENNEY.